(12) United States Patent
Lin et al.

(10) Patent No.: US 6,842,339 B2
(45) Date of Patent: Jan. 11, 2005

(54) AFFIXING DEVICE FOR AFFIXING FRONT COVER, BACK COVER AND BATTERY UNIT OF A PERSONAL DIGITAL ASSISTANT

(75) Inventors: Yao-Chung Lin, Yunghe (TW); San-Chi Ho, Yunghe (TW)

(73) Assignee: High Tech Computer, Corp, Taoyuan (TW)

( * ) Notice: Subject to any disclaimer, the term of this patent is extended or adjusted under 35 U.S.C. 154(b) by 0 days.

(21) Appl. No.: 10/373,086

(22) Filed: Feb. 26, 2003

(65) Prior Publication Data

US 2003/0165355 A1 Sep. 4, 2003

(30) Foreign Application Priority Data

Mar. 1, 2002 (TW) ........................................ 91103876 A

(51) Int. Cl.[7] ................................................. G06F 1/16
(52) U.S. Cl. ...................... 361/683; 361/679; 361/681; 379/433.01; 220/836; 429/7
(58) Field of Search ................................. 361/679, 681, 361/682, 683, 684, 824; 379/433.01, 433.04, 433.13; 429/7, 8, 9, 15, 163, 179, 96–100, 123; 320/2, 15; 455/90, 566; 220/836

(56) References Cited

U.S. PATENT DOCUMENTS

| 5,200,883 | A | * | 4/1993 | Kobayashi ................... 361/683 |
| 5,733,674 | A | * | 3/1998 | Law et al. ...................... 429/9 |
| 6,617,063 | B1 | * | 9/2003 | Ohnishi .......................... 429/7 |
| 2003/0083019 | A1 | * | 5/2003 | Wong et al. .................. 455/90 |
| 2004/0096054 | A1 | * | 5/2004 | Nuovo ................... 379/433.01 |
| 2004/0169044 | A1 | * | 9/2004 | Chen et al. ................. 220/836 |

* cited by examiner

Primary Examiner—Michael Datskovskiy
(74) Attorney, Agent, or Firm—Rabin & Berdo, P.C.

(57) ABSTRACT

An affixing device is used for affixing together a front cover (306a), a back cover (306b), and an extra battery unit (304) of a personal digital assistant (300). The affixing device includes a first screw (204(1)) and a second screw (202(1)), wherein the first screw is used to penetrate through the back cover and to firmly tighten onto the front cover, so that the front cover and the back cover are affixed together. The second screw is used to penetrate through the extra battery unit and firmly tighten on the first screw. As a result, the extra battery unit is affixed to the back cover.

6 Claims, 3 Drawing Sheets

AFFIXING DEVICE FOR AFFIXING FRONT COVER, BACK COVER AND BATTERY UNIT OF A PERSONAL DIGITAL ASSISTANT

This application claims the benefit of Taiwan application Serial No. 091103876, filed Mar. 1, 2002.

BACKGROUND OF THE INVENTION

1. Field of Invention

The present invention relates to an affixing device. More particularly, the present invention relates to an affixing device used for affixing a front cover, a back cover, and a battery unit of a personal digital assistant (PDA).

2. Description of Related Art

As the high technology industry is greatly and rapidly developed, the technology is updated day by day. So many versatile electronic products have been developed. In the recent years, the functions of the portable products have been greatly improved, with increasingly diverse abilities. As a result, it can provide convenience for the user in managing the daily routine work or the personal business in a quite flexible way without being limited by the office location and the office hour. In particular, the product of the personal digital assistant (PDA) has been introduced to the market, and brings the user many conveniences. However, since the PDA uses a battery for supplying the needed power, the powering period is limited. Some manufactures would add an extra battery on the back surface of the housing of the personal digital assistant, so as to prolong the PDA's usage time period. The conventional method of how to affix the extra battery unit to the housing of the PDA is described in the following.

Referring to FIG. 1, it is an exploded drawing, schematically illustrating the conventional structure of a personal digital assistant with a battery unit mounted onto the housing. As shown in FIG. 1, the personal digital assistant 100 includes a housing 102, a battery unit 104, and a touch display panel 110. The housing 102 has a front cover 106a and a back cover 106b. The front cover 106a and the back cover 106b are affixed together with screws 108a and 108b. The front cover 106a and the back cover 106b must be designed to have a number of affixing holes with respect to the screws 108a and 108b, so as to allow the screws 108a and 108b to securely screw the front and back covers 106a, 106b together. In addition, the touch display panel 110 is implemented on the front cover 106a, so that a screen can be displayed to the user and the user can operate it by touching the panel. Because the extra battery unit 104 will be firmly mounted onto the back cover 106b of the housing 102, the manufacturer usually will design two transpiercing holes 112a and 112b in the extra battery unit 104. Also, the back cover 106b is designed to have two other affixing holes 114a and 114b. After the user inserts the screws 116a and 116b into the two transpiercing holes 112a and 112b, respectively, the user can firmly tighten the screws 116a and 116b into the affixing holes 114a and 114b by using a screwdriver. As a result, the extra battery unit 104 is affixed onto the back cover 106b. It is certain that the extra battery unit 104 must be coupled with the internal circuit board of the personal digital assistant 100, in order to supply the electric power for the prolonged use period.

It should be noted that the current trend of the PDA design is toward a light weight and compact product, so as to satisfy the practical need of the modern people. Thus, the size of the housing of the personal digital assistant needs to be reduced. Additionally, since the original front cover and the back cover have been affixed to the housing by a number of screws, it is not easy for the user to find the proper place to form the extra affixing holes on the more compact housing. This would make it difficult for the user to affix the extra battery unit onto the housing of the smaller personal digital assistant by using extra screws. Finally, the affixing holes 114a, 114b are located beside the screws 108a, 108b, and extend in the back cover 106b a distance through the internal circuit board received in the back cover 106b. This results in that valuable area of the internal circuit board is reduced, which increases the difficulty in layout of circuitry of the internal circuit board, particularly when the internal circuit board is used in the personal digital assistant, which is very small.

SUMMARY OF THE INVENTION

It is at least an objective of the present invention to provide an affixing device for affixing together the front cover, the back cover, and the extra battery unit of a personal digital assistant. One screw is used to affix the front cover and the back cover of the PDA, and another screw is used to penetrate through the extra battery unit and affix to the first screw, so that the extra battery unit can be affixed to the back cover. The affixing holes 114a, 114b in the prior art are not necessary in the present invention, so that the valuable area of the internal circuit board can be reserved. This invention also satisfies the design requirement of the personal digital assistant having the properties of small size and light weight.

In accordance with the objective of the present invention, an affixing device is provided for use to affix together a front cover, a back cover, and an extra battery unit of a personal digital assistant. The affixing device includes a first screw and a second screw, wherein the first screw is used to penetrate through the back cover and to firmly tighten onto the front cover, so that the front cover and the back cover are affixed together. The second screw is used to penetrate through the extra battery unit and firmly tighten on the first screw. As a result, the extra battery unit is affixed to the back cover.

BRIEF DESCRIPTION OF THE DRAWINGS

The accompanying drawings are included to provide a further understanding of the invention, and are incorporated in and constitute a part of this specification. The drawings illustrate an embodiment of the invention and, together with the description, serve to explain the principles of the invention. In the drawings.

DESCRIPTION OF THE PREFERRED EMBODIMENT

The present invention particularly designs an affixing device, used for affixing together a front cover, a back cover, and an extra battery unit of a personal digital assistant. The affixing device includes a first screw and a second screw, wherein the first screw is used to penetrate through the back cover and to firmly tighten onto the front cover, so that the front cover and the back cover are affixed together. The second screw is used to penetrate through the extra battery unit and firmly tighten on the first screw. As a result, the extra battery unit is affixed to the back cover. As to the actual application of the affixing device of the present invention, it is described by using a preferred embodiment in accordance with the attached drawings.

Figure 1:
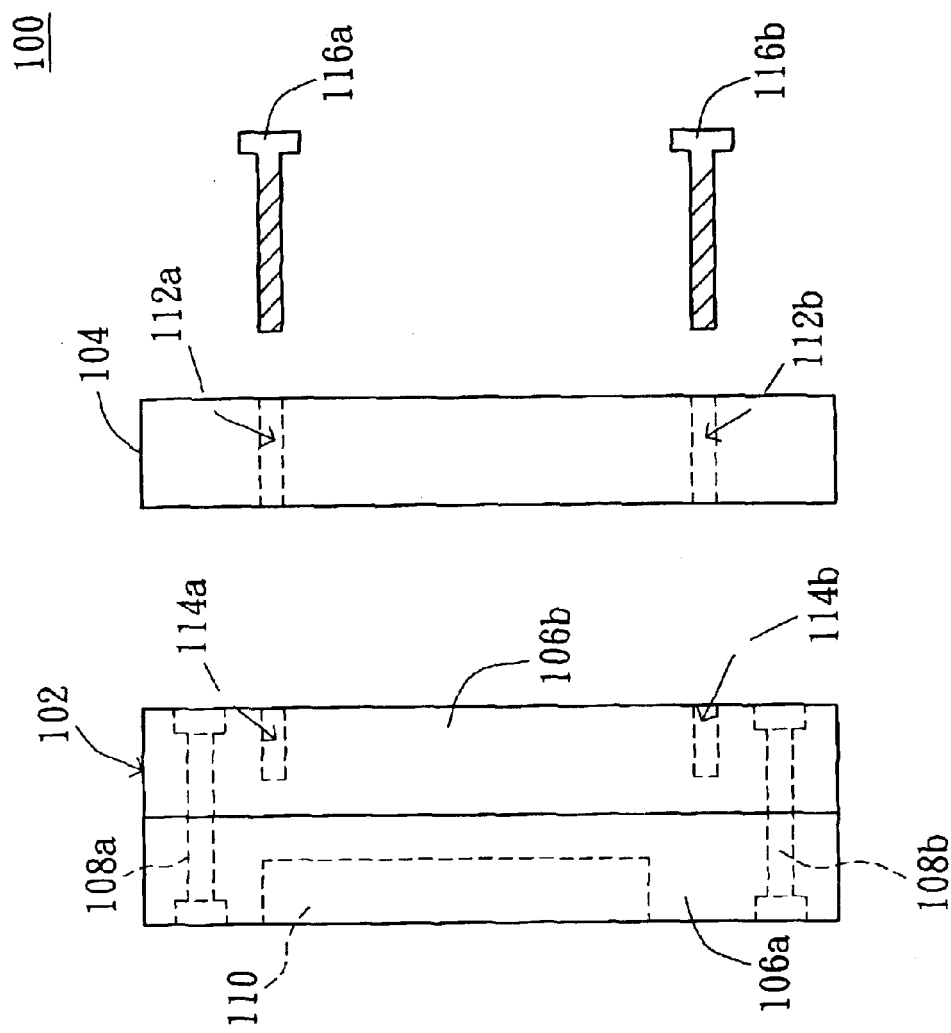
FIG. 1 is an exploded drawing, schematically illustrating the conventional structure of a personal digital assistant with a battery unit mounted on the housing.
Figures 2A, 2B:
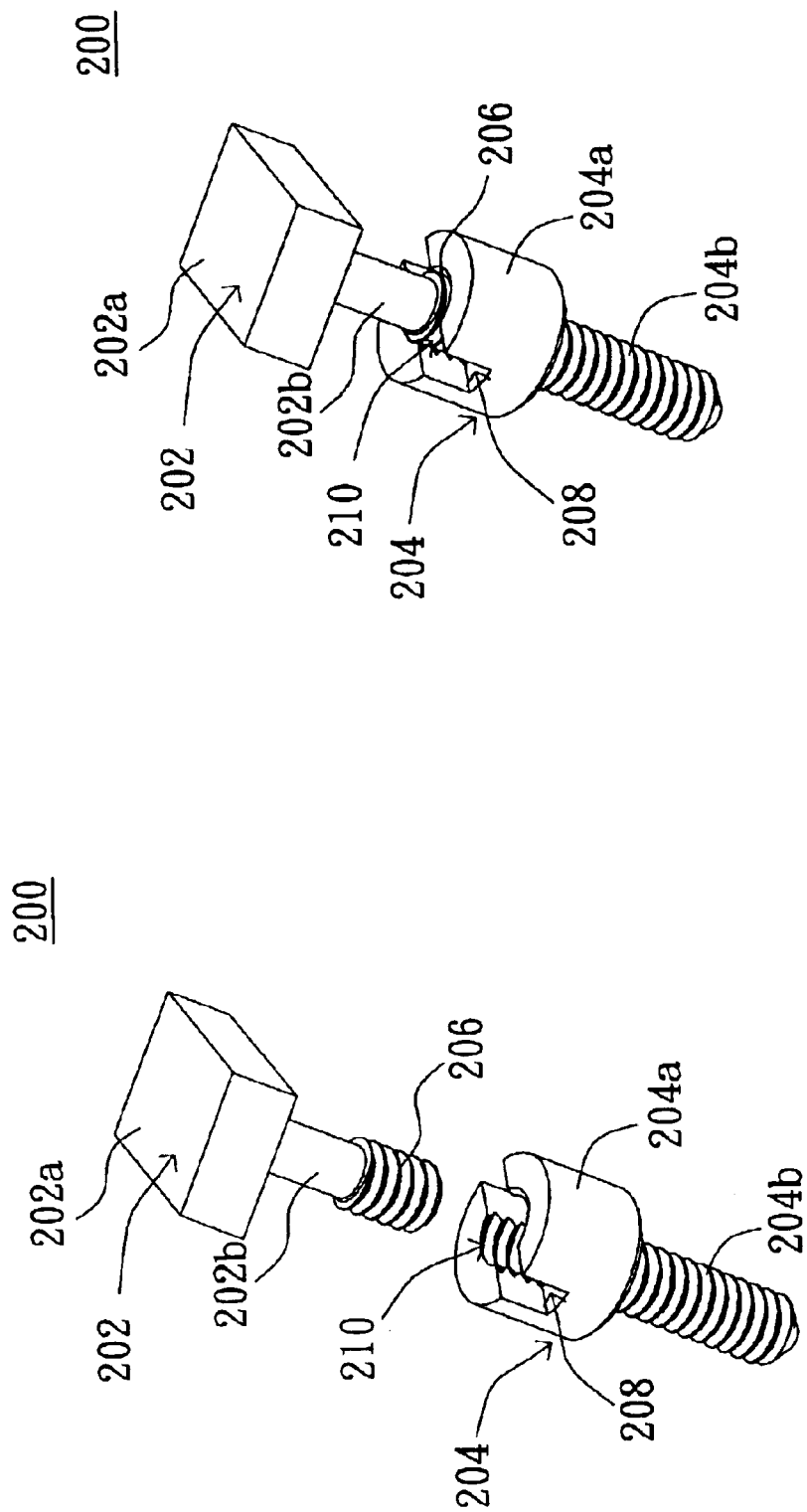
FIG. 2A is an exploded drawing, schematically illustrating the structure of the affixing device for affixing together the front cover, the back cover, and the extra battery unit of a personal digital assistant, according to a preferred embodiment of the present invention.
FIG. 2B is a drawing, schematically illustrating the assembled structure of the affixing device for affixing together the front cover, the back cover, and the extra battery unit of the personal digital assistant, according to the preferred embodiment of the present invention.

Referring to FIG. 2A and FIG. 2B at the same time, they are respectively the exploded drawing of the structure of the invention and the drawing schematically illustrating the assembled structure of the affixing device for affixing together the front cover, the back cover, and the extra battery unit of the personal digital assistant, according to the preferred embodiment of the present invention. As shown in FIG. 2A and FIG. 2B, the affixing device 200 includes two screws 202 and 204, wherein the screw 202 has a screw head 202a and a straight rod 202b. The screw head 202a is used to allow the user to exert a force to rotate the screw 202. The other end of the straight rod 202b has a screw thread 206, which is used to be couple with the screw 204. As a result, the screw 202 is affixed to the screw 204, wherein the screw 204 includes a screw head 204a and a threaded screw rod 204b. The screw head 204a has a plain trench 208 and a groove with screw thread 210. The groove with screw thread 210 is located in a middle of and communicates with the plain trench 208. The plain trench 208 is used to allow the user to insert a screwdriver for exerting the force and rotating the screw 204 in convenience. The groove with screw thread 210 is used for being well coupled with the screw thread 206.

Therefore, the present invention can first affix together the front cover and the back cover of the personal digital assistant via the screw 204, so that a housing of the personal digital assistant is formed. Then, the present invention uses the screw 202 to affix the extra battery unit onto the housing. It should be noted that, for the affixing device 200 in FIG. 2B, a bottom end of the screw head 202a and the top end of the screw head 204a must have a distance that is greater than or equal to the thickness of the extra battery unit. In this manner, the extra battery unit can be securely affixed to the back cover. The mechanism, of how to affix the front cover, the back cover, and the extra battery unit by the affixing device 200 is described in the following in accordance with the drawings.

Figure 3:
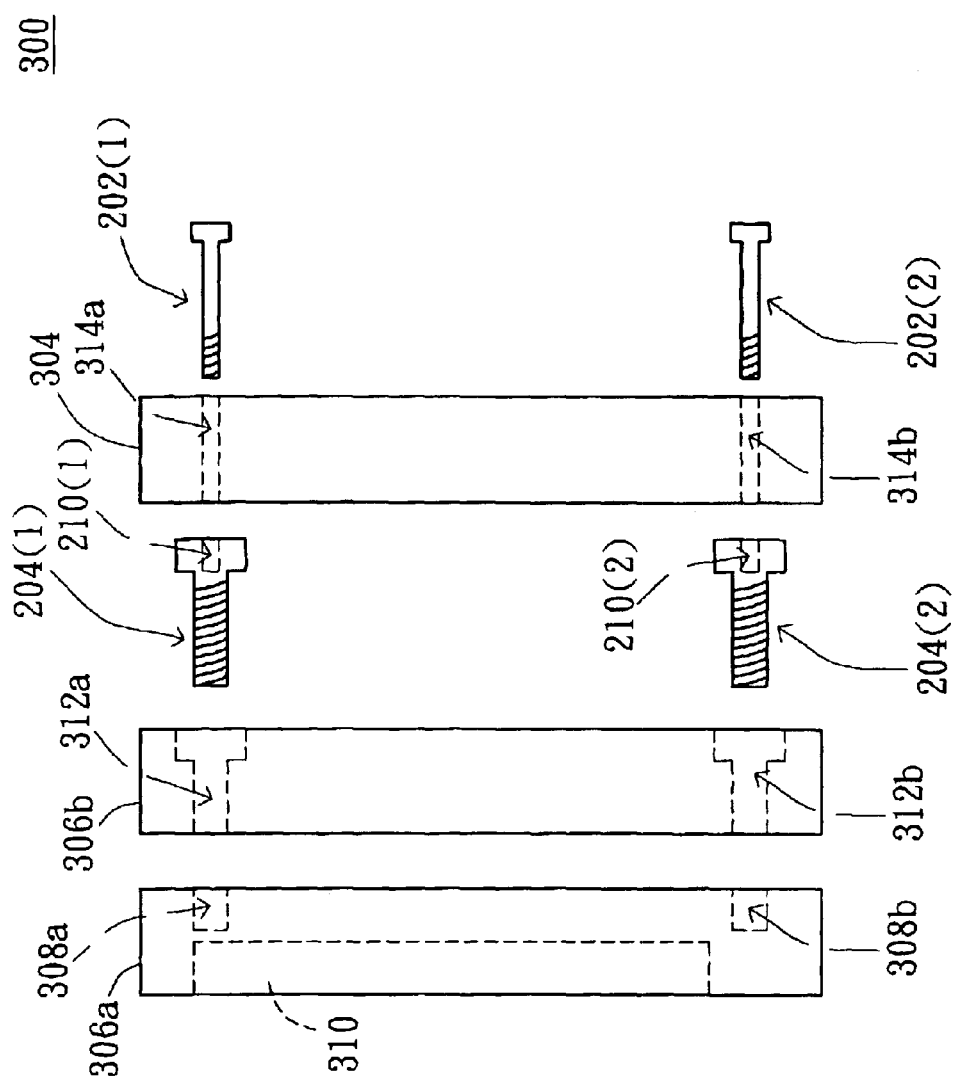
FIG. 3 is an exploded drawing, schematically illustrating the structure of a personal digital assistant with an extra battery and an affixing device, according to a preferred embodiment of the present invention.

Referring to FIG. 3, it is an exploded drawing, schematically illustrating the structure of a personal digital assistant 300 with an extra battery 304 and an affixing device, according to a preferred embodiment of the present invention. As shown in FIG. 3, the personal digital assistant 300 includes a front cover 306a, a back cover 306b, the extra battery unit 304, a touch display panel 310, a screw 202(1), a screw 202(2), a screw 204(1) and a screw 204(2). The screws 202(1), 202(2) each have a structure the same as the screw 202 of FIGS. 2A and 2B. The screws 204 (1), 204 (2) each have a structure the same as the screw 204 of FIGS. 2A and 2B. The touch display panel 310 is disposed on the front cover 306a, so as to display the image screen and allow the user to operate by touching it. The front cover 306a includes affixing holes 308a and 308b, and the back cover 306b has transpiercing holes 312a and 312b which are corresponding to the affixing holes 308a and 308b, respectively. In addition, the extra battery unit 304 has transpiercing holes 314a and 314b, which correspond to the transpiercing holes 312a and 312b, respectively.

When the user intends to assemble the front cover 306a and the back cover 306b together, the user first puts the screws 204(1) and 204(2) to respectively extend through the transpiercing holes 312a and 312b. When the screws 204(1) and 204(2) extend through the transpiercing holes 312a and 312b of the back cover 306b, the user then can firmly tighten the screws 204(1) and 204(2) to the front cover 306a at the affixing holes 308a and 308b. As a result, the front cover 306a and the back cover 306b are secured together to form the housing of the personal digital assistant 300. Then, the user again uses the screws 202(1) and 202(2) to respectively extend through the transpiercing holes 314a and 314b of the extra battery unit 304. When the screws 202(1) and 202(2) extend through the transpiercing holes 314a and 314b of the extra battery unit 304, the user then can firmly tighten the screws 202(1) and 202(2) into grooves with screw thread 210(1) and 210(2) of the screws 204(1) and 204(2). As a result, the extra battery unit 304 can be affixed onto the back cover 306b. Then, the user can accomplish the assembly of the front cover 306a, the back cover 306b, and the extra battery unit 304 by using the affixing device of the present invention, which includes the screws 204(1), 204(2), 202(1), 202(2). It is certain that the extra battery unit 304 has to be coupled with an internal circuit board of the personal digital assistant 300 in the back cover 306b, so as to provide the needed electric power.

However, the persons skilled in the art should be capable of understanding that the technology of the present invention is not limited to the foregoing descriptions. For example, the affixing device of the present invention can also be applied to affix a structure, which needs to affix three structure layers. Further still, the top end of the screw 202 can also be designed as a concave groove, so as to allow the user to insert a screwdriver to rotate the screw 202 with convenience. Both the screw head 202a and the straight rod 202b can be a structure being formed as a single integrated structure. In addition, the screw head 204a and the threaded screw rod 204b can also be a structure being formed as a single integrated structure.

In summary of the disclosure for the foregoing preferred embodiment of the present invention about the affixing device used for affixing a front cover, a back cover, and a battery unit of a personal digital assistant, one of the screws can be used to affix the front cover and the back cover of the personal digital assistant. Also, another screw can be used to penetrate through the extra battery unit and firmly tighten on the previous screw. As a result, the extra battery unit is affixed to the back cover. Also, since the screws 202 (1), 202 (2) for fastening the extra battery unit 304 and the back cover 306b together engages in the heads of the screws 204 (1), 204 (2), in the present invention, there is no need to provide holes beside the holes 312a, 312b to accommodate the screw thread of the screws 202(1), 202(2). Thus, there is no need to provide holes in the internal circuit board in the back cover 306b for extension of the screws 202 (1), 202 (2). Accordingly, the precious area of the internal circuit board can be reserved for facilitating the layout of circuitry on the internal circuit board.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device comprising:
   a front cover including a display therein;
   a back cover attached to the front cover;
   an auxiliary device attached to the back cover;
   a first fastening device connecting the front and back covers together; and
   a second fastening device connecting the auxiliary device and the back cover together, wherein the second fastening device engages with the first fastening device.

2. The electronic device as recited in claim 1, wherein the first fastening device is a first screw with a head in the back cover and a screwed rod threadedly engaging with the front cover.

3. The electronic device as recited in claim 2, wherein the second fastening device is a second screw threadedly engaging with the head of the first screw.

4. The electronic device as recited in claim 1, wherein the auxiliary device is a battery.

5. The electronic device as recited in claim 3, wherein the auxiliary device is a battery.

6. The electronic device as recited in claim 3, wherein the head of the first screw includes a trench adapted for receiving a screw driver so that the first screw can be rotated by the screw driver, and a threaded groove in the trench in which the second screw threadedly engages with the threaded groove.

* * * * *